July 19, 1932.  W. K. McMILLAN ET AL  1,868,148
TRACK LINK
Filed June 9, 1930  3 Sheets-Sheet 2

INVENTOR.
Wesley K. McMillan
Jacob J. Walch.
BY Townsend, Loftus & Abbett
ATTORNEYS.

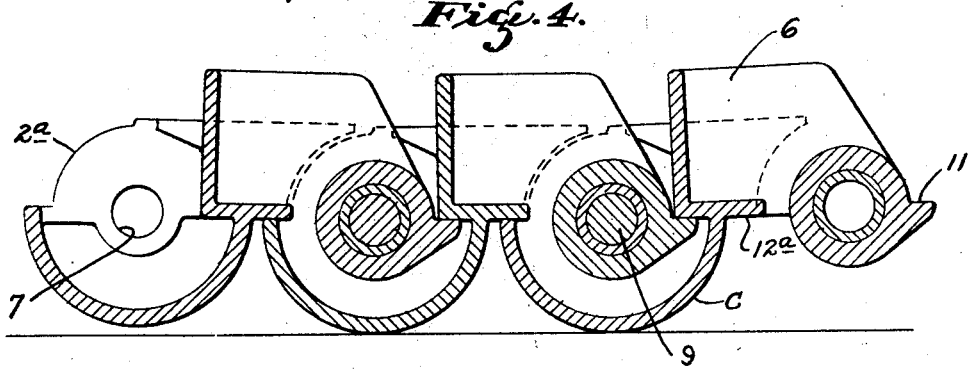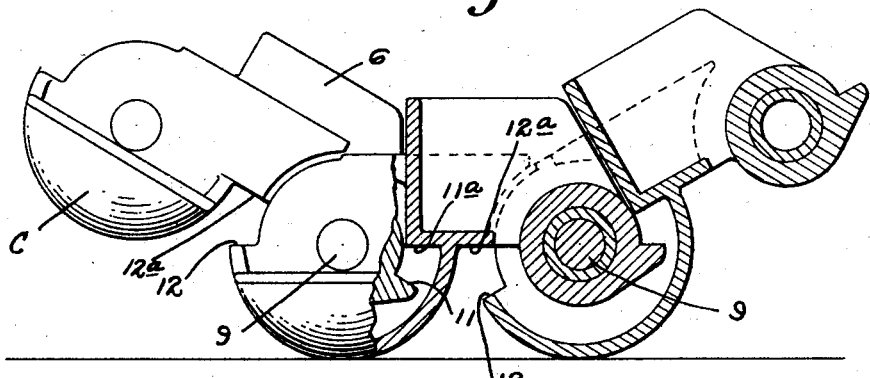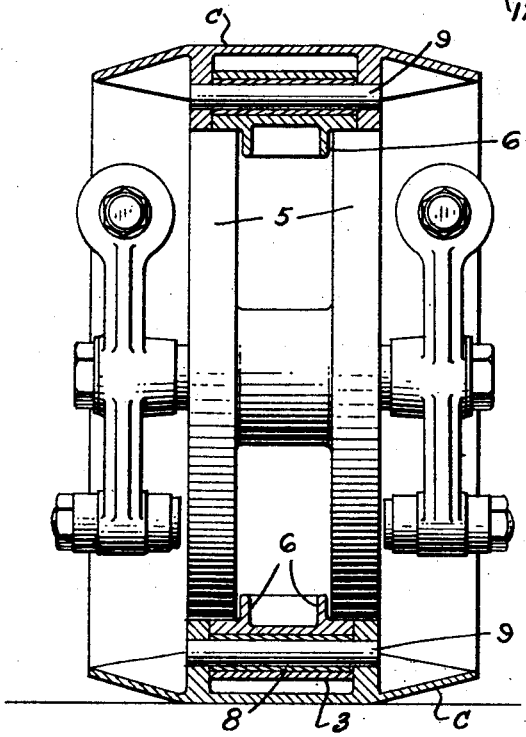

Patented July 19, 1932

1,868,148

UNITED STATES PATENT OFFICE

WESLEY K. McMILLAN AND JACOB S. WALCH, OF SAN FRANCISCO, CALIFORNIA, ASSIGNORS, BY DIRECT AND MESNE ASSIGNMENTS, TO McMILLAN-MILLER ROAD MACHINERY—INC., A CORPORATION OF CALIFORNIA

TRACK LINK

Application filed June 9, 1930. Serial No. 459,897.

This invention relates to a track link such as used in self laying track trailers, tractors, and like vehicles.

The object of the present invention is to generally improve and simplify the construction and operation of track links of the character described; to provide a track in which all links are identical in construction; to provide a track consisting of a plurality of pivotally connected links in which the links are free to swing about their pivots in one direction but limited in their pivotal movement in the opposite direction; to provide a track in which the assembled links present a curved or arcuate surface with relation to the ground; to provide a track link in which pin wear is reduced to a minimum; to provide a track link having a shoe or grouser which functions as a traction member and as a housing and enclosure for the link pins; to provide a double interlock between each pair of links which extends across the entire width of the links and which function to support the links so as to present an arcuate traction surface; and further, to provide an interlock between the links whereby the link pins are relieved of shear action when the links are in engagement with the ground surface.

The invention is shown by way of illustration in the accompanying drawings, in which—

Figure 1:
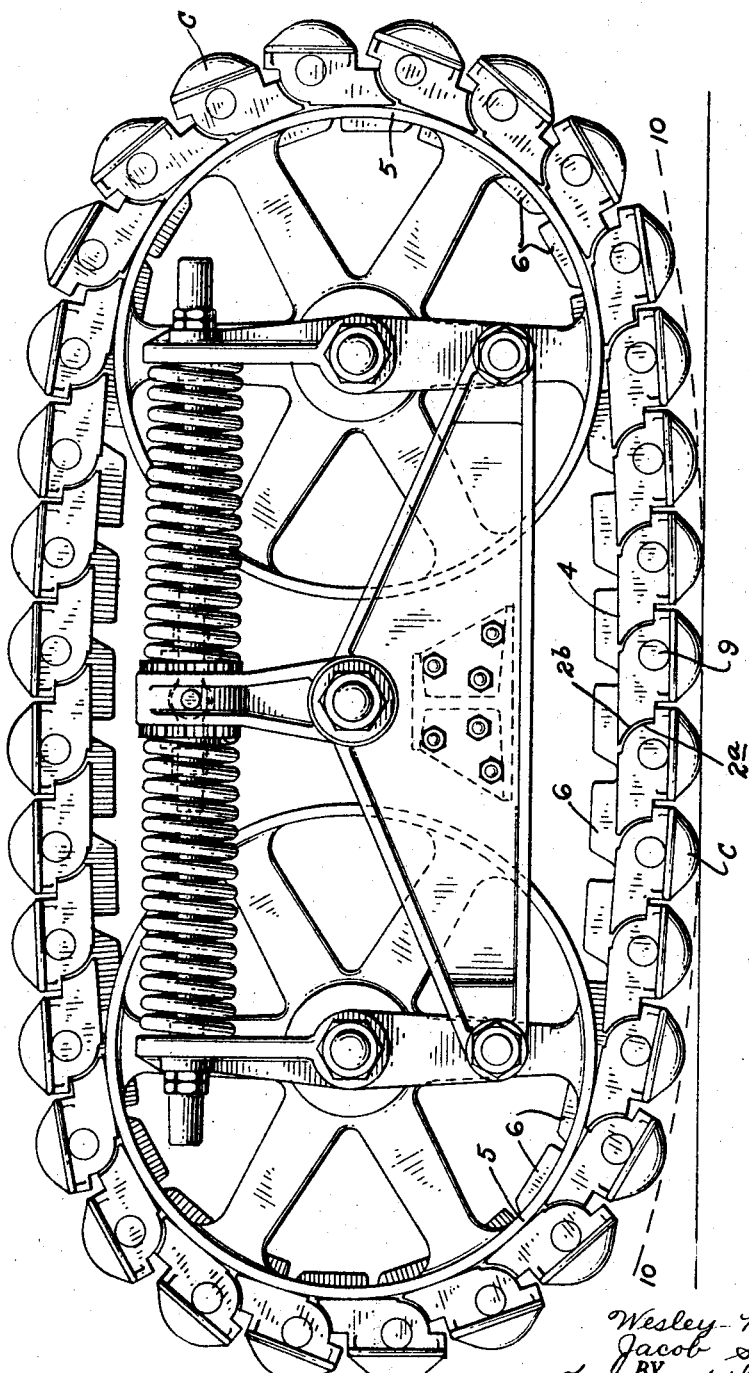

Fig. 1 is a side elevation showing the links assembled to present a track surface, said elevation also showing the idler wheels and the frame in which they are journaled.

Figure 2:
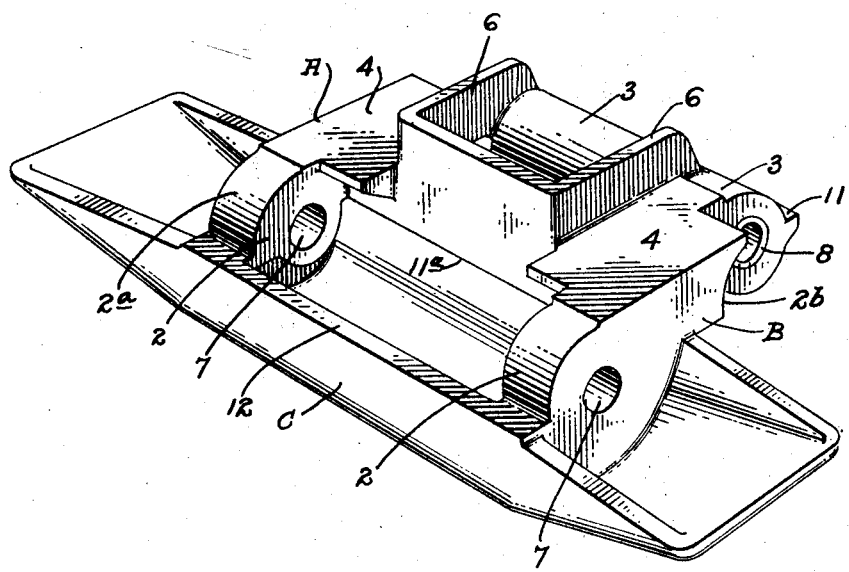
Figure 3:
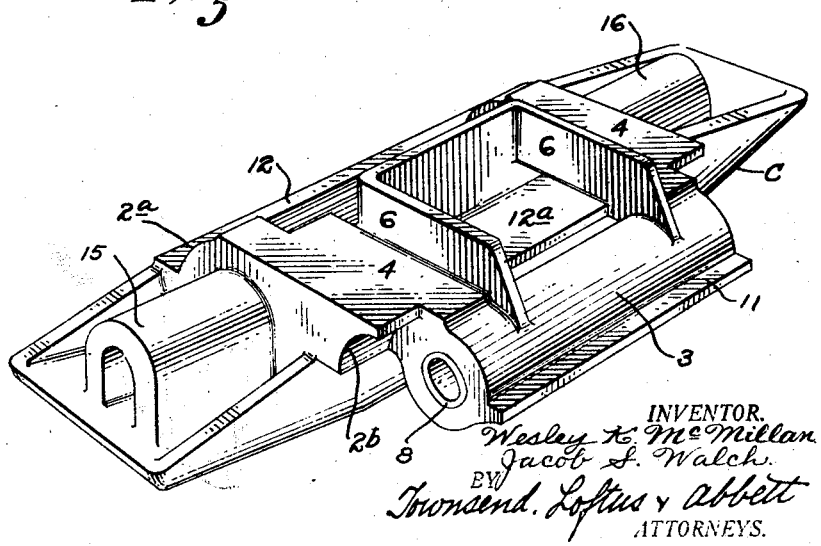

Fig. 2 is a perspective view of one of the links showing the type of link employed on trailers, Fig. 3 is a perspective view of the type of link employed on tractors, Fig. 4 is a longitudinal, vertical section of a plurality of connected links showing the position they assume when in engagement with a traction surface, Fig. 5 is a similar section showing the position assumed by the links when passing around the idler wheels, and Fig. 6 is a cross section of the track structure shown in Fig. 1.

Referring to the drawings in detail and particularly Figs. 2 and 3, A and B indicate a pair of interspaced link bars, which terminate at one end in bearing lugs 2 and at their opposite ends in a bearing sleeve 3. A shoe or grouser C is cast integral with the link bars A and B and the lugs 2. Bearing sleeve 3 is also cast integral with the link bars and a rigid connection is accordingly formed between the link bars. The upper edges of the respective links present flat surfaces such as indicated at 4 which are engaged by the flanges 5 of the driving sprockets or idler wheels as the case may be but as two interspaced idler wheels are shown at each bight end of the track, see Fig. 6, guide flanges 6 are provided to maintain the track in alignment between the wheels.

The links are identical in construction and the only machining required is that of drilling the bearing lugs 2 as indicated at 7 and boring the bearing sleeve 3 to permit insertion of a bushing 8. The links are assembled by inserting the bushed bearing sleeves 3 between the bearing lugs 2 of an adjacent link and then connecting them by inserting a link pin 9, the pin being secured by being driven through the lugs 2. The bearing sleeve 3 is free on the pin and pivotal movement between the links is accordingly permitted.

One of the important features of the present invention is that of providing a plurality of identical links which when assembled as shown in Fig. 1 will present an arcuate traction surface such as indicated by the dotted line 10—10. This is accomplished by forming interlocks between the links. This interlock is accomplished as follows: Formed on each bearing sleeve 3 is a lug 11 which extends from end to end thereof. This lug when the links are assembled projects in under shoulder 11a formed on the adjacent link. The shoulder 11a is extended as indicated at 12a and forms a second shoulder which is engaged by the rear edge 12 of the traction shoe disposed in front thereof, hence when the links are assembled and are in engagement with the ground surface as shown in Fig. 1 an interlocking connection is formed by the lug 11, and shoulder 11a, and an interlock is also formed between the rear edge of shoe 12 and shoulder 12a thus preventing the links from swinging about their pivots to assume a horizontal position. The amount of pivotal movement between the links being such that an arcuate surface is presented to the ground as indicated by the dotted line 10—10. The load of the tractor or the trailer is of course carried by the flanges 5 of the idler wheels. This load is in turn transmitted to the track surfaces 4 of the links. This load due to the arcuate surface presented would tend to transmit a shearing action to the link pins but such shearing action is avoided by providing interlocks between the links at the ends thereof. These interlocks are formed by the rounded ends 2a of the bearing lug ends of the links 2 and by similarly rounding the opposite ends of the links as indicated at 2b. The two rounded shoulders thus formed engage each other when the links assume the position shown in Fig. 1, or in other words, when the members 11a and 12a are engaged with the members 11 and 12 respectively, and endwise movement between the links is accordingly taken up by the shoulders 2a and 2b, hence relieving the link pins of any shearing action and in fact of any load action. The only time the link pins can be subjected to load will be when the track is used on the tractor. In that case the links A and B will be provided with rounded exterior lugs such as shown at 15 and 16. These lugs will be engaged by the teeth of the driving sprockets and when so engaged a pull will naturally be exerted between the links tending to separate them. Such separating movement is of course transmitted as a load to the pins and it is the only load to which they will be subjected. The lugs 15 and 16 are shown as having hollow centers which are in alignment with the holes 7 in the bearing lugs 2 and 2a, permitting insertion and removal of link pins 9.

If reference is made to Figs. 2, 3 and 4, it will be noted that pin wear is reduced to a minimum not only because of the endwise interlock formed between the links which eliminates any shearing action of the pins but it is also due to the fact that the grousers or shoes C form an enclosing housing which substantially excludes dirt and grit. The interlocking connection formed between the links by means of the shoulders 11a, 12a and the lugs 11 and 12 is an important feature as it causes the links to present an arcuate traction surface. Such a surface eliminates the use of intermediate trucks between the idler wheels thereby reducing weight and cost of construction and it furthermore permits ready turning or steering of vehicles of this character.

While certain features of the present invention are more or less specifically described, we wish it understood that various changes may be resorted to within the scope of the appended claim. Similarly, that the materials and finishes of the several parts employed may be such as the manufacturer may decide, or varying conditions or uses may demand.

Having thus described our invention, what we claim and desire to secure by Letters Patent is—

In a structure of the character described, a track consisting of a plurality of connected links, each of which comprises a pair of interspaced link bars, said bars terminating in bearing lugs at one end, a bearing sleeve formed integrally with and connecting the opposite ends of the link bars, a shoe extending crosswise of the link bars and extending outwardly beyond them, said shoe being formed integrally with the bars and the major portion of said shoe being curved, the common axis of said bearing lugs being the center of curvature, said shoes also being semi-cylindrical in contour between the said lugs to form a pocket for the reception of the bearing sleeve of an adjacent link positioned between the bearing lugs, a link pin pivotally connecting the bearing lugs of the link with the bearing sleeve of an adjacent link, stop means on each end of the link for engagement with adjacent links to limit rotative movement of the links about the link pins, and hollow lugs, adapted to be engaged by teeth of a driving sprocket wheel, formed integrally with the bearing lugs and the shoe adjacent the ends of said link pin.

WESLEY K. McMILLAN.
JACOB S. WALCH.